(12) United States Patent
Prabhakar et al.

(10) Patent No.: US 8,799,247 B2
(45) Date of Patent: Aug. 5, 2014

(54) SYSTEM AND METHODS FOR ENSURING INTEGRITY, AUTHENTICITY, INDEMNITY, AND ASSURED PROVENANCE FOR UNTRUSTED, OUTSOURCED, OR CLOUD DATABASES

(75) Inventors: Sunil Prabhakar, West Lafayette, IN (US); Rohit Jain, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/370,519

(22) Filed: Feb. 10, 2012

(65) Prior Publication Data
US 2012/0209822 A1 Aug. 16, 2012

Related U.S. Application Data

(60) Provisional application No. 61/441,998, filed on Feb. 11, 2011.

(51) Int. Cl.
*G06F 17/30* (2006.01)
(52) U.S. Cl.
USPC .......................................................... 707/703
(58) Field of Classification Search
None
See application file for complete search history.

(56) References Cited

U.S. PATENT DOCUMENTS

| | | | |
|---|---|---|---|
| 6,505,191 B1 | 1/2003 | Baclawski | |
| 7,395,436 B1* | 7/2008 | Nemovicher | 713/193 |
| 8,199,651 B1* | 6/2012 | Schrempp et al. | 370/235 |
| 8,364,634 B2* | 1/2013 | Horii | 707/610 |
| 8,417,680 B2* | 4/2013 | Miyashita et al. | 707/703 |
| 8,538,931 B2* | 9/2013 | Majumdar | 707/684 |
| 2008/0065596 A1 | 3/2008 | Shadmon et al. | |
| 2010/0185847 A1 | 7/2010 | Shasha et al. | |
| 2010/0250589 A1 | 9/2010 | Tsai | |

OTHER PUBLICATIONS

Min Xiey, Haixun Wang, Jian Yinz, and Xiaofeng Meng, Integrity Auditing of Outsourced Data, Sep. 23-28, 2007, Vienna, Austria.
Feifei Li, Marios Hadjieleftheriou, George Kollios, and Leonid Reyzin, Dynamic Authenticated Index Structures for Outsourced Databases, Technical Report BUCS-TR-2006-004, Apr. 22, 2006, pp. 1-25, Boston.

* cited by examiner

*Primary Examiner* — Bai D. Vu
(74) *Attorney, Agent, or Firm* — Valauskas Corder LLC (57) ABSTRACT

A system and methods for providing guarantees about faithful execution of databases that run under the control of an untrusted entity—such as a cloud computing service provider—that is different than the owner of the data and applications being outsourced; or runs on a server that may be compromised by unauthorized users. Specifically, the system and methods establishes that an untrusted database is being faithfully hosted and provides indemnity for the service provider from false claims, enabling the server to prove its innocence against untrue claims of faulty operation. The invention also provides assured provenance for all changes made to the database.

15 Claims, 8 Drawing Sheets

SYSTEM AND METHODS FOR ENSURING INTEGRITY, AUTHENTICITY, INDEMNITY, AND ASSURED PROVENANCE FOR UNTRUSTED, OUTSOURCED, OR CLOUD DATABASES

This application claims the benefit of U.S. Provisional Application No. 61/441,998 filed Feb. 11, 2011.

STATEMENT CONCERNING FEDERALLY SPONSORED RESEARCH

This invention was made with government support under NSF IIS-1017990 awarded by the National Science Foundation. The government has certain rights in the invention.

FIELD OF THE INVENTION

The invention relates generally to computer databases hosted on untrusted servers, and more specifically, to a system and methods for ensuring transact tional consistency and integrity, and assured provenance of a computer database running on an untrusted server, such as a cloud server.

BACKGROUND OF THE INVENTION

Ensuring the integrity and authenticity of data is of ever increasing importance as data are generated by multiple sources, often outside the direct control of fully trusted entities. Increasingly, data are subjected to environments which can result in invalid (malicious or inadvertent) modifications to the data. Such possibilities clearly arise when data are hosted in a cloud computing environment where complete control over the hardware and software running at the cloud servers is lacking. Invalid modifications can also arise when the data are maintained on trusted servers, but the data may get modified by a malicious insider or an intruder that manages to compromise the server or the communication channels. In these situations, it is desirous to be ensured that the data retrieved from an untrusted server are trustworthy (i.e., the data and retrieved values have not been tampered or incorrectly modified).

With the advent of Cloud Computing there is increasing interest to move operations, including databases, onto a cloud platform. Although Cloud Computing holds great promise, it raises a number of security and privacy concerns. It also raises concerns about the fidelity of the service. In particular, since the clients have little or no direct control over the software and hardware that is running at the servers, there is reluctance to blindly trust the server. For example, a server may be improperly configured, or inadvertently left open to hacker attacks. There is also the concern about the server being attacked by an external entity that can corrupt the outsourced data or service despite the best efforts of the server. Even though, the cloud service provider is likely to be honest, it may try to hide its failure. Currently, users have no recourse but to trust the server or rely on legal agreements. Even with such agreements, it is difficult for a user to discover, let alone prove, any foul play by the server.

For purposes of this application, the term "untrusted database" is used herein to refer to one or more of the of the following situations: (1) a database that is hosted on a cloud server, (2) a database that has been outsourced to a third party, or (3) a database running on a machine that could be compromised by insiders or hackers.

There are several challenges for ensuring the authenticity and integrity of databases primarily due to the ability to execute queries over this data—e.g., using SQL—and to make updates to parts of the database. The correctness of query results and validity of updates are crucial requirements for databases. In order to ensure authenticity, it is necessary for the database server to guarantee correctness, completeness and transactional consistency.

Correctness requires that all answers to a given query do indeed come from the authentic database. In other words, this implies that the values returned are not manufactured by the server or corrupted along the communication path.

Completeness requires that all tuples that should be present in a query answer are indeed part of the answer. In other words, the database host has evaluated the query correctly and has returned all tuples that are produced as a result without dropping any out.

Transactional consistency requires that the current consistent state is indeed the correct state corresponding to the initial state followed by the correct application of all previous valid transactions. Query freshness is part of transactional consistency.

Many applications may also require, e.g., due to regulatory compulsions, to keep the provenance of updates to the database. This can be particularly important to check if malicious activity occurred in the past. For purposes of this application, the term "provenance" refers to the order of changes to a database, the exact transactions that made those changes, and the authorization from an accessor that authorized the changes.

Existing solutions assume that the data being outsourced to a third-party are not modified at the outsourcing server. In other words, it is assumed that all updates are authenticated by the data owner and then sent to the database server such that the legitimacy of any data that is part of the outsourced database is established directly by the data owner. In an untrusted database setting (e.g., a cloud database setting), this assumption breaks down. A typical outsourced database usually supports large numbers of authorized clients that run transactions directly on the database. Updates to the data are made through these transactions. It is infeasible for the database owner to determine the correct updates for each transaction. The validity of these modifications made to the database is determined by the standard transactional semantics of databases. Thus, there is a need to assure the database owner that the (untrusted) server is indeed correctly executing all transactions.

In addition to these requirements from the data owner's perspective, there is a requirement from the outsource service provider's perspective. The server should be able to prove its innocence if it has faithfully executed all transactions, for example, indemnity for the server against false claims of malpractice.

Given that the goal of the outsourcing is to alleviate the burden on the data owner, satisfactory solutions need to minimize the overhead and role of the data owner in establishing the authenticity and integrity of the solutions. In this regard, existing solutions are inadequate as they require the data owner to play a significant role. In addition, existing solutions also place significant overhead on the service provider. While this may work for some applications, many outsourced databases are expected to have both a large size and high rate of querying and updates. Thus it is necessary to explore more efficient solutions with low overheads for all involved parties.

Therefore, there is a need for a novel solution to ensure authenticity and integrity of an untrusted database in the presence of transactional updates that runs directly on the untrusted database. There is also a need for an authentication mechanism to ensure correctness, completeness, and transactional consistency, including the assurance to the database owner that the (untrusted) server is indeed correctly executing all transactions. Furthermore, there is a need for providing indemnity of the server against false claims of incorrect operation. In addition, there is a need for implementing the aforementioned checks without excessive demand on the server resources or altering the internal structure of the outsourced database. The invention satisfies these needs. In addition, the invention provides assured provenance for all changes to the data—i.e., using the exact same mechanism for ensuring authenticity and integrity, the invention can provide incontrovertible evidence about all the modifications that have been made to the data.

SUMMARY OF THE INVENTION

The invention is a system and methods for providing guarantees about faithful execution of databases that run under the control of an untrusted entity such as a cloud computing service provider that is different than the owner of the data and applications being hosted at the untrusted server. Specifically, the invention establishes when an untrusted database server is being faithfully hosted. Furthermore, the invention provides indemnity for the service provider from false claims, enabling the server to prove its innocence against untrue claims of faulty operation. It also provides assured provenance for all changes made to the database. The untrusted database cannot fabricate assured provenance.

There are three main types of entities involved in an untrusted database: owner, host and accessor. The owner owns the database. More specifically, the owner owns the data and authenticates the accessors such that they can access the data from the server. The owner wants to host the database at the host and also wants to ensure that the changes sent to the host by the accessors (in the form of transactions) are applied correctly by the host. The host is the cloud service provider server that hosts the database. The accessor is the one or more clients that access this data from the server. It is contemplated that an accessor may include an owner. Clients are authorized by the owner and can independently authenticate themselves with the server.

In most cloud computing settings, the server is likely to be at least semi-honest. In other words, the server will not maliciously alter the data or query results. However, due to reasons such as poor implementation, failures, over-commitment of resources, some loss of data or updates may occur. Given the lack of direct control over the server, the owner should not assume that the host is infallible. Thus, assumptions about the host are minimal.

The owner and the accessor need to be ensured that the database is operated faithfully such that the host does not violate the integrity and authenticity of the data. The host is interested in hosting the owner's database (possibly in return for a fee) and makes efforts to ensure that the owner is convinced about the fidelity of the hosting service. The host controls the hardware and software that is used to host the database and has complete control over all the data. The host has unconditional read and write access to the data, and can intercept all queries posed to the database as well as the results of the query. It is also contemplated that the host may modify the stored data or the results sent back to the accessor.

For the purpose of this application, the term "consistent state" means the initial state of a database and any subsequent state. The correct—isolated, atomic—execution of a transaction over a consistent state takes the database to a new consistent state. It should be noted that a consistent state is a conceptual notion. In reality, multiple transactions may execute concurrently and can have various SQL isolation levels. Thus, in practice, the database is often in an inconsistent state represented by the partial execution of concurrent transactions.

In the case of strict isolation, each transaction sees a consistent, committed state of the database corresponding to the state produced after completing a set of earlier committed transactions. All its reads are from this consistent state. If the transaction is able to successfully execute and commit, it generates a set of updates which must all be installed atomically to produce the next consistent state. Thus, test for ensuring the integrity and authenticity of a transaction's execution can be divided into three sub-components: (1) establishing that all values read by the transaction come from a single consistent state (in particular, one that reflects the updates of all prior committed transactions, in correct order); (2) faithful execution of the transaction using these values—this includes correctness and completeness of all data read, and determination of the correct values of the transaction's updates, and (3) establishing that all updates generated by this execution have been applied to the database.

The term "faithful execution" means that: (1) only those transactions authorized by the data owner and authorized clients are executed; (2) all such transactions are executed; (3) each transaction is executed in the correct order; and (4) each transaction is correctly executed.

An assessment of "transactional consistency" (in addition to correctness and completeness) is required to ensure that the untrusted database achieves faithful execution. Transactional consistency requires that each transaction is run against a consistent database containing all, and only the changes of all previously committed transaction, in order of their commits. Consequently, the current consistent state is indeed the correct state corresponding to the initial state followed by the correct application of all previous valid transactions. Furthermore, any updates generated by the transaction are reflected in the updated database upon commitment. Query freshness is part of transactional consistency.

Transactional consistency is particularly important in situations where updates to the database results from modifications that are not known to the owner, but are determined by the correct evaluation of a transaction on the existing database. Many databases regularly operate this way such as a transaction that pays interest for each account in a banking application, or a transaction that transfers funds between two accounts. In each case, the correct value of the updated data is determined by the values read from the database, and the logic of the transaction.

To ensure transactional consistency, the owner or the accessor must have authorized the execution of the transaction. The owner needs to be ensured that the transaction was faithfully executed by the host without any tampering of the results. Furthermore, any subsequent queries should be answered against this resulting database following the transaction's commitment. Transactional consistency ensures that the database host does not: (1) drop a transaction—i.e., pretends to execute it, but does not; (2) add an invalid transaction not authorized by the owner or the accessor; (3) alter the order of execution of transactions; or (4) alter the data read by or modified by a transaction.

From the point of view of authentication, transactional consistency is at least guaranteed for "replayable transactions". A "replayable transaction" is a transaction that is deterministic. Specifically, the outcome of the transaction—the outputs it generates, the values of its updates and its decision to commit or abort—is completely determined by the values that it reads from the database and its input parameters. This is a reasonable assumption for databases as it is used in most systems and research in databases. Under this assumption, the host does not need to prove all transactions are executed under faithful execution since this can be verified by a simple re-execution of the transaction over the same consistent state that was visible to the transaction when it was run by the host.

In one embodiment of the invention, a transaction can be specified either as: (i) an SQL statement, or (ii) the identity of a well-defined transaction, for example, a transfer, a withdrawal, a stored procedure, or some embedded code predefined by the owner, a host, and/or an accessor. This does not in any way limit the ability of the owner or the host to issue arbitrary queries—they can simply send an SQL command to the host—but it does obviate the need to send large pieces of transaction code to the host. Instead, a request to execute a transaction can simply specify the transaction by this identity or SQL statement without embedded code. For example, an accessor could ask a host to "transfer" $500 from one account to another. In the case of a stored procedure or embedded code, it is in the host's interest to impose this restriction so that the host can be protected from false claims. The stored procedure or embedded code would be authorized by the owner and immutable. Thus, if the accessor asks to run such a transaction, the host knows exactly what code is running and the owner or the accessor cannot question the outcome that the host has produced if the host faithfully runs the transaction. This restriction can be removed by allowing the owner or the accessor to submit arbitrary code as a transaction to be run at the server. The owner or accessor would have to sign this code for the host to accept it.

The present invention sets up a strict serializable transaction that sees a consistent database state corresponding to the atomic execution of earlier committed transactions. During the execution of a transaction, the state of the database may not be in a consistent state, for example, there may be uncommitted changes made by other concurrent transactions. However, if only strict serializable transactions are allowed, when a transaction is allowed to commit it is certain that its execution is equivalent to having run in isolation against the consistent state produced by the execution of all transactions that have committed earlier (in the order of commits). The sequence of commit operations in a database defines the progression of the committed state of the database. Even though two or more transactions can run concurrently, when they are committed, they become serialized.

In one embodiment of the invention, transactional consistency is ensured via a three-step process. First, the owner and the host perform an initialization step by confirming an initial consistent database state. Second, transactions are requested by the accessor and executed by the host. For every executed transaction, the host generates a commit sequence number, creates the verification object of the consistent database state before and after the transaction, and returns a proof of database states to the owner and the accessor for further confirmation. The accessor then passes the proof to the owner who then compares the proofs from the host and the accessor. Third, the accessor can arbitrarily verify a given (current or past) transaction, which is accomplished by retrieving the verification objects for all values read by the transaction, retrieving the proof of database states before and after the transaction from the owner, and confirming the outputs and updates of the transaction based on information supplied by the host and the owner. All signed messages are verified by the recipient. Those of skill in the art will appreciate that the execution and verification of a single transaction may be extended to multiple relations.

While it is certainly feasible for the owner to validate every single transaction, this results in a heavy burden on the owner. In practice, the owner will likely validate transactions randomly with a frequency that reflects the owner's distrust of the host.

It is an advantage of the present invention that the owner may identify any transaction that has been executed in the past and ask for it to be validated without any forewarning to the host during the execution of the transaction.

It is a further advantage of the present invention that once the owner (or the accessor) requests the validation of a transaction, it is impossible for the host to go back and "fix" any errors or omissions with respect to the execution of that transaction.

It is a further advantage of the present invention that provides an indemnity for the database host against false claims made by the owner or the accessor. In other words, if the database host faithfully executes the database, the host may prove its innocence without depending upon the owner or the accessor.

It is a further advantage of the present invention that makes it possible to detect failures on the host's part to faithfully host the owner's dynamic database. The host supports a transactional interface (e.g., SQL) to the data allowing the owner to view and update the owner's data.

It is a further advantage of the present invention that if the host makes any invalid changes to the database or the results of queries, the owner should be able to discover this and be able to prove this error.

It is a further advantage of the present invention that if the host does indeed faithfully operate the database, then the host should be able to establish innocence, for example, such that the host is indemnified against invalid claims by the owner or the accessor if the host faithfully executes the database.

It is a further advantage of the present inventions that the host can provide an authentic provenance for all changes made to the data. The host cannot fabricate false provenance. The invention and its attributes and advantages will be further understood and appreciated with reference to the detailed description below of presently contemplated embodiments, taken in conjunction with the accompanying drawings.

DETAILED DESCRIPTION

As described herein, the preferred embodiments of the present invention provide a method for ensuring the transactional consistency of an untrusted database. Below are the details of certain embodiments, however, this does not limit other embodiments from using other suitable methods or materials. Those of skill in the art will appreciate that the following description is related to preferred and/or example embodiments of the present invention. Certain embodiments of the present invention are defined exclusively within the appended claims.

Figure 1:
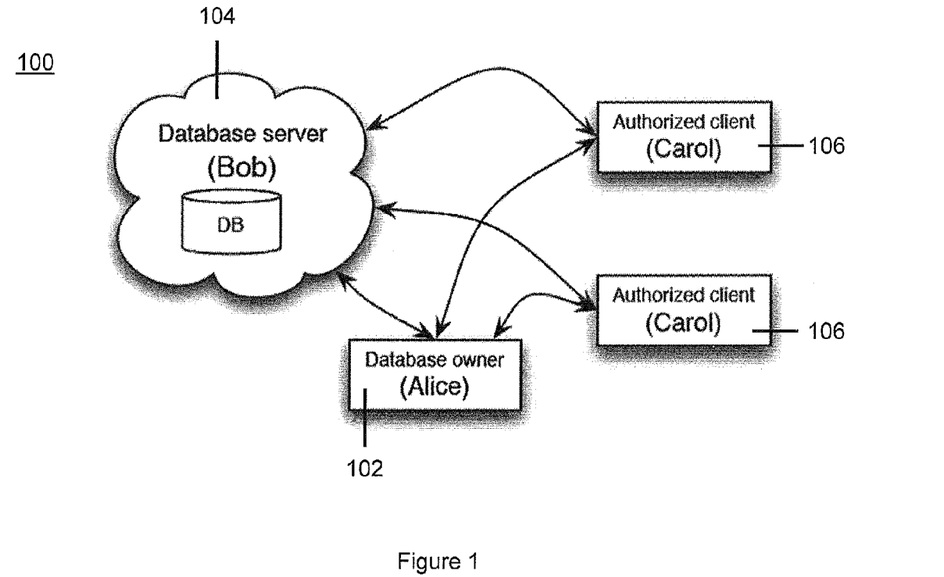
FIG. 1 illustrates a diagram of entities relating to an untrusted database system according to one embodiment of the invention.

FIG. 1 illustrates a diagram of entities relating to an untrusted database system according to one embodiment of the invention. As shown in FIG. 1, there are three main types of entities involved in an untrusted database system 100: owner 102, host 104 and accessor 106. The owner owns the database including the data of the database and authenticates the accessors such that they can access the data from the server. The host is the untrusted server that hosts the database, e.g., a cloud service provider. The accessor is the one or more clients that access this data from the server. It is contemplated that an accessor may include an owner. Clients are authorized by the owner and can independently authenticate themselves with the server.

A list of symbols used in the specification and their descriptions are summarized in Table 1:

TABLE 1

Symbol Table

| Symbol | Description |
|---|---|
| t | a tuple in a relation |
| $t_i$ | the $i^{th}$ tuple of a relation |
| h(x) | the value of a one way hash function over x |
| $\Phi(x)$ | label of node x in MB-Tree |
| a‖b | concatenation of a and b |
| VO | a verification object |
| $T_i$ | the $i^{th}$ committed transaction |
| $DB_i$ | the consistent DB state after the $i^{th}$ commit |
| $MBT_i$ | the proof structure after the $i^{th}$ commit |
| $Proof_i$ | the MB-tree root label after the $i^{th}$ commit |
| $S_{User}(M)$ | message M signed by User |

Figure 2:
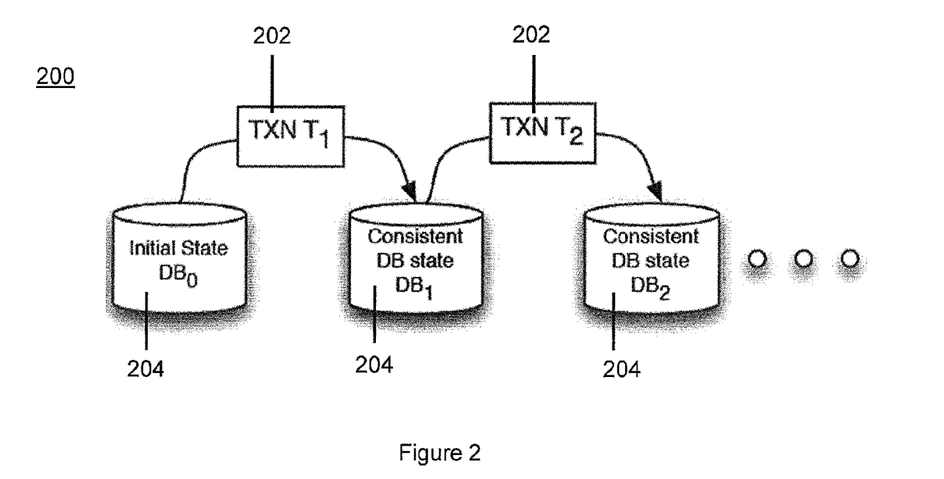
FIG. 2 illustrates a simplified view of database consistency according to one embodiment of the invention.

FIG. 2 illustrates a simplified view of database consistency 200 according to one embodiment of the invention. As shown in FIG. 2, each transaction 202 sees a consistent, committed state 204 of the database corresponding to the state produced after completing a set of earlier committed transactions. All its reads are from this consistent state. If the transaction is able to successfully execute and commit, it generates a set of updates which must all be installed atomically to produce the next consistent state.

In one embodiment of the invention, the database authentication process employs data securities tools including, inter alia, one-way hashing, hash trees such as Merkle Hash Trees ("MHT") and Merkle Binary Trees ("MBT" or "MB-Tree"), and digital signatures, as described in detail below. Although the invention is discussed herein with respect to Merkle Trees, other hash trees are also contemplated, for example, a Markovian Binary Trees.

A one-way hash function is a function h, that takes as input a data item x and produces as output the hash of the data item y=h(x). Important requirements for a one-way hash function are (1) given a hash value y, and the details of the hashing function h, it is very difficult to find x such that h(x)=y and (2) the probability that h(x)=h(y) for x≠y is very low, for example, it is unlikely that two different input values will yield the same hash. Therefore, given a hashed value y, it is virtually impossible to discover any data value that yields y as its hash value. Also, given a value x, it is virtually impossible to generate a value z which yields the same hash value. There are many well-known and commonly used strong one-way hash functions such as SHA-256.

A Merkle Binary-Tree ("MBT" or "MB-Tree"), or simply Merkle Tree, is a binary tree with labeled nodes. For this application, $\phi(n)$ represents the label for node n. If n is an internal node with children $n_{left}$ and $n_{right}$, then:

$$\phi(n_{parent}) = h(\phi(n_{left}) \| \phi(n_{right}))$$  Equation 1

The function h is a one-way hash function. Labels for leaf nodes are commuted using data values depending upon the application. For example, in the case of a relation, each leaf represents a tuple, and the label is calculated as the hash of that tuple.

A digital signature serves a role similar to regular signatures in that: (1) it enables the recipient to ascertain without doubt the author of a message; (2) it prevents forgery—i.e., it is (computationally) infeasible for the owner to sign a message with the host's signature, and (3) the signature is not reusable, for example, a message signed by the owner cannot be used to generate a signature for another message. One possible scheme for signing documents involves public-key cryptography and one-way hash functions. In order to sign a message, M, the owner first produces a hash of the message and then encrypts the hash using a private key: $S_{Owner}(h(M))$. The message M, and the signature, $S_{Owner}(h(M))$ are referred together as a signed message, or $S_{Owner}(M)$. To verify a signed message, the host applies the same hash function to the message to get h(M). The host then decrypts the signature using the owner's public key. If the decrypted value matches the hash that the host computed, the host is certain that the owner has signed the message M.

In one embodiment of the invention, the correctness of a transaction may be verified using data securities tools. Those of skill in the art will appreciate that the following description is related to preferred and/or example embodiments of the present invention and does not limit other embodiments from using other suitable methods.

Figure 3:
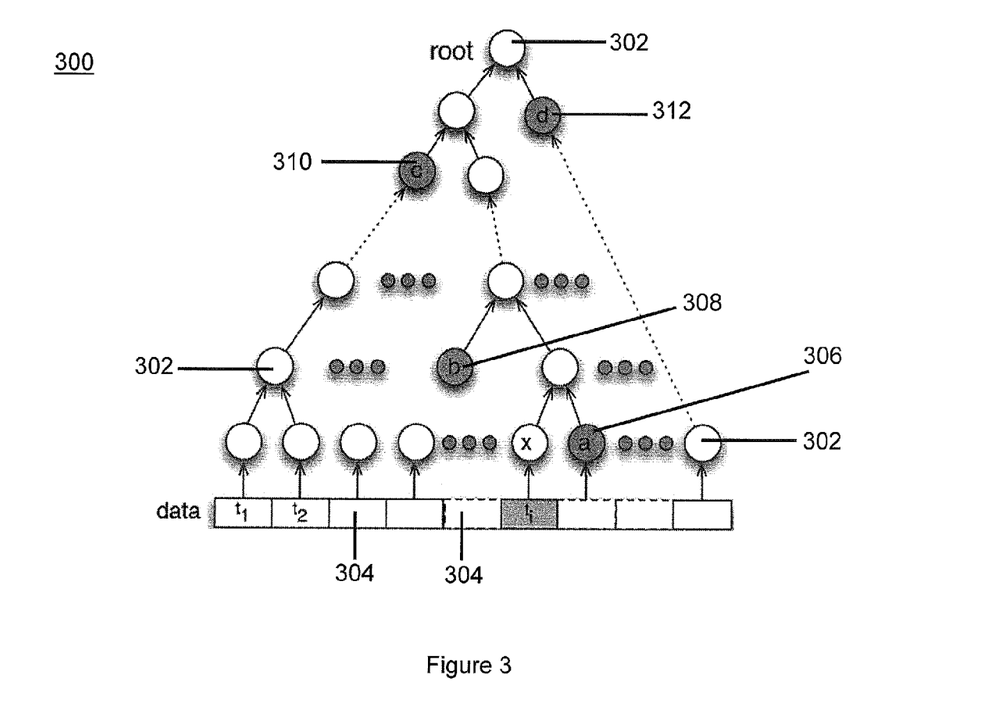
FIG. 3 illustrates a structure of a Merkle Hash Tree according to one embodiment of the invention.

Merkle trees can be used to establish the correctness of query results from an untrusted database. Initially, when the data owner chooses to host a database table on an untrusted host, she computes a Merkle tree over the table as follows. The hash of each tuple's value is computed: $h(t_i)$. These hash values represent the labels of the leaves of the Merkle tree. The labels for all the non-leaf nodes in the Merkle tree are computed using Equation 1. The data owner saves only the value of the root label. The data are then sent to the host for servicing queries. The host computes the same Merkle tree structure over this data and then services queries from the data owner. FIG. 3 shows an example of the tree produced. The correctness of each tuple, $t_i$, in the result of any query is established as follows: the data owner requests the Verification Object (VO) for tuple $t_i$. Let x be the leaf node whose label was computed as the hash of $t_i$. The VO for $t_i$ consists of all sibling nodes along the path from x to the root of the Merkle tree. In FIG. 3, these nodes are shaded and are: a; b; c; d. The host returns to the data owner the VO for $t_i$. The data owner uses the value of $t_i$ that she is trying to verify to compute the label of x. Then uses this label and the label for a from the VO to compute the label for x's parent, etc. all the way to the label for the root. If this value is the same as the label for the root that the data owner had computed before hosting the data, the data owner is convinced that $t_i$ must be part of the original table. If not, then the data owner is unconvinced that the database is uncompromised.

Note that the hash function has to be public. The label of the root saved by the data owner is known as the proof. Of course, it is also possible for the accessor to submit queries and verify the correctness of each answer similarly. All the accessor needs to know is the value of the root label initially computed by the owner. This can be obtained directly from the owner at any time.

The owner could sign the label for the root and publish it to the accessor. The signature ensures that the accessor does indeed have the correct label. If the verification of the correctness of individual attributes of tuples is desired, then it suffices to add one more level to the Merkle tree structure (a new leaf level). Instead of hashing an entire tuple to produce the label for a leaf, the leaf labels can be computed by hashing individual attributes. The next level up combines all the labels for a single tuple into a label for the parent of these nodes. This implies that the structure is no longer a binary tree, but that does not cause any problems. Individual attributes can now be verified in a manner similar to tuples as discussed herein.

Establishing completeness requires that the owner or the accessor are assured that all answers that should be in the result are indeed in the result. In one embodiment of the invention, the completeness of a transaction may be verified using data securities tools as described below. Those of skill in the art will appreciate that the following description is related to preferred and/or example embodiments of the present invention and does not limit other embodiments from using other suitable methods.

Figure 4:
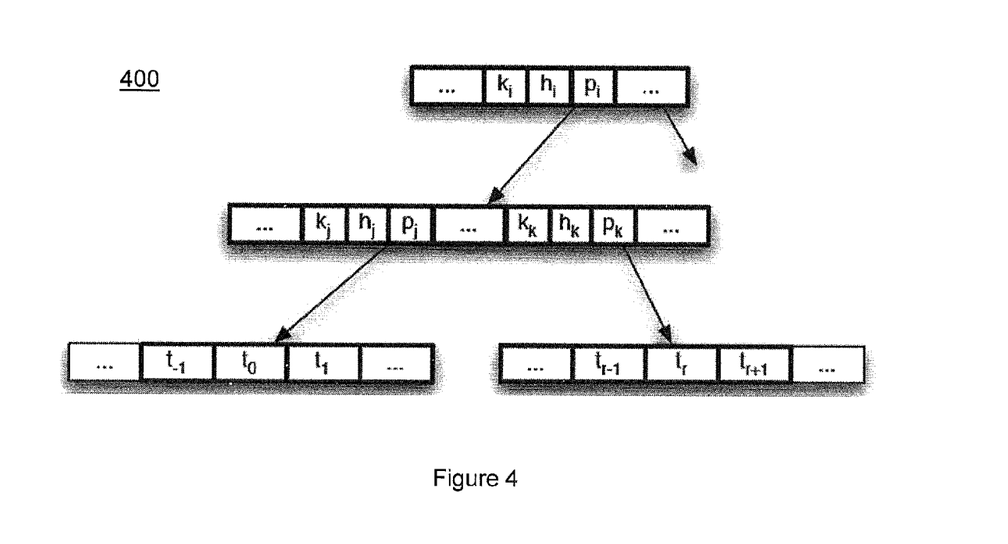
FIG. 4 illustrates a structure of a MB-Tree for completeness according to one embodiment of the invention.

In one embodiment of the invention, Merkle Trees can be easily extended to use a B+-tree to establish completeness of a query. An MB-Tree behaves just like a regular B+-tree with its keys extended with child hash values. Similar to the Merkle Tree, the label of each non-leaf node is computed by hashing concatenation of labels of its children. Label of a leaf node is computed by hashing concatenation of hash values of each tuple entry in the node. A MB-Tree is used to establish the completeness of the results of a query. FIG. 4 shows an example tree 400 for establishing completeness. Consider a range query which returns tuples $t_0 \ldots t_r$. To establish the completeness of tuples satisfying a range, the VO consists the tuple just before the range ($t_{-1}$) and the tuple just after the range ($t_{r+1}$). VO then includes the path from those two tuples to the root. To establish completeness, the data owner computes the labels for all tuples in the results and the two surrounding values from the VO. She then computes the labels of ancestor nodes working her way up the tree. The VO contains the labels of nodes that she needs to compute the ancestor label and also which tuples belongs to the same leaf node. Finally, the data owner compares the label computed for the root with the root label she stored earlier to determine if indeed the result set contains all the tuples that should have been returned. If this is the case, the data owner is assured that all valid tuples were returned to her. The data owner verifies that $t_0$ and $t_{r+1}$ are outside the query range, ensuring that the query results were indeed complete.

If the data owner wishes to update the data that she has previously hosted at the server, she can do so by simply sending the updates to the host after recomputing the Merkle Tree structure incorporating the updates. The host similarly applies the updates to the structure that he maintains. All subsequent queries are then answered using the updated database at the host server, and verifications are now based upon the newly generated structure. Thus, the data owner must use the new proof which is the value of the hash of the new root after incorporating the changes to the data.

This solution requires that (i) all updates have to be routed through the data owner and (ii) if the data owner wants to verify the update, she has to do it before executing further updates. A skilled person in the art will appreciate that other embodiment of the invention does not require the owner to know the new data values or to retain a copy of the original data, for verifying transaction updates not generated by the owner, as discussed in greater detail below.

In one embodiment of the invention, the step of initializing the database process is performed. In the beginning, the owner and the host independently compute $MBT_0$—the MB-Tree structure over the initial state of the relation. The owner retains only the label of the root of this structure—this is the proof for the initial state, $Proof_0$. The host sets up the database with this initial table, ready for processing transactions from the owner and the accessor. This process can be summarized as follows: (1) the owner sends the initial database, $DB_0$ to the host, (2) the host computes $MBT_0$, and sends $S_{Host}(Proof_0)$ to the owner, (3) the owner independently computes $Proof_0$ and verifies what the host has sent; and (4) the owner retains $Proof_0$.

In accordance with an embodiment of the invention, the commit operation and serialization of the transactions are exemplified below. For example, an initial database corresponding to consistent state $DB_0$ and if two transactions $T_1$ and $T_2$ run concurrently over this database, they begin to produce an inconsistent state corresponding to the partial execution of both transactions.

Without loss of generality, assume that $T_1$ commits first. This produces a new consistent state, $DB_1$ that incorporates only the changes of $T_1$. The actual database may still reflect an inconsistent state containing uncommitted changes of $T_2$. When $T_2$ attempts to commit, it will only be allowed to commit if its execution is consistent with being run after $T_1$ (i.e., against $DB_1$). This is the role of concurrency control and is achieved by locking or other means. If $T_2$ cannot be committed, there is no need to worry about its effects as they will not be in any consistent state. If $T_2$ is serializable after $T_1$ it will be committed and will now produce the new consistent state $DB_2$. Any subsequently committed transaction will have to be correct with respect to $DB_2$.

To establish that a given transaction, ran against a particular consistent state, $DB_{i-1}$, the host may produce the correct MBT structure corresponding to $DB_{i-1}$. Although the database at any time is in flux and contains inconsistent states, the MBT structures are only updated at the time of transaction commitment. The correctness and completeness of each transaction may be established by data tools security, as described further herein.

Thus, each new MBT reflects the commitment of exactly one transaction. In other words, a one-to-one correspondence between the conceptual consistent states and the proof structure is maintained—a new version of the structure is generated in one step only upon the commitment of a transaction. This new structure is computed from the previous structure by applying the changes made by exactly one transaction—the one that has just committed. The host has to declare this structure at the time of commitment of a transaction (by sending out a signed copy of the new root or $Proof_i$ beyond the host's control), and be able to use this structure when asked to verify the correct execution of the transaction, which will also involve the structure before the commitment of the given transaction.

Figure 5:
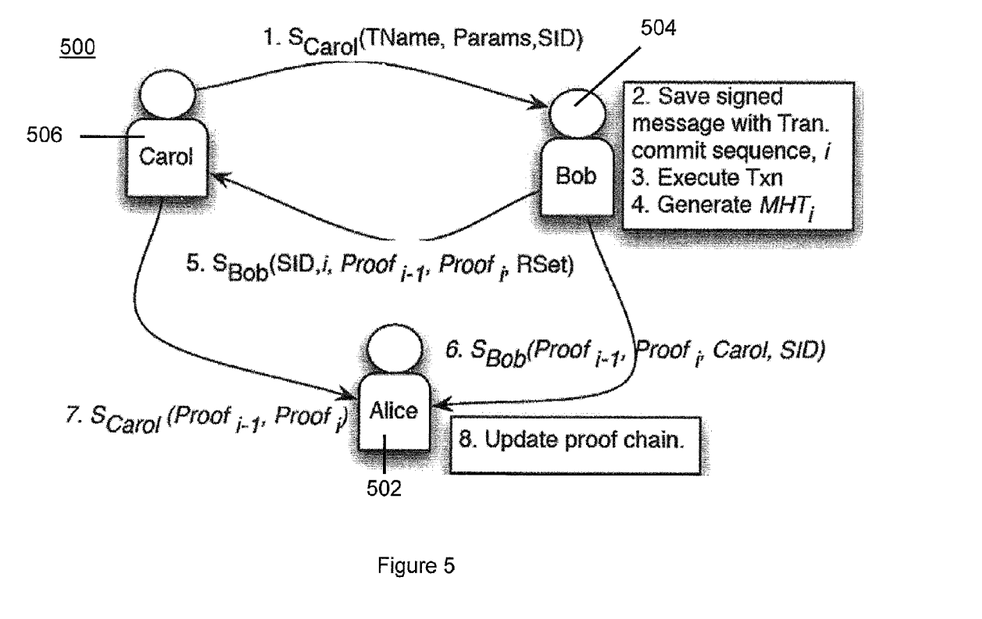
FIG. 5 illustrates transaction execution steps according to one embodiment of the invention.

In accordance with one embodiment of the invention, the transaction execution of a database process is performed. FIG. 5 illustrates transaction execution steps according to one embodiment of the invention including an owner 502, a host 504, and an accessor 506. To execute a transaction, the accessor sends to the host a signed message containing the identity of the transaction (as discussed above), all necessary parameters (e.g., account numbers), and a unique transaction sequence number for each transaction submitted by the accessor (if there are multiple accessors, i.e., multiple authorized clients, the number needs to be unique for each such client, but not necessarily across all clients). The host verifies the signature to be that of the accessor and examines the message. The host rejects a transaction request from the accessor if the sequence number is not larger than the earlier request from the same client. The sequence numbers prevent replay attacks by the host. That is, the host will be prevented from reusing a transaction request to run that transaction multiple times.

The host then runs the requested transaction. The host keeps track of the data items and written by the transaction. If the transaction successfully commits, the host installs the updates produced by the transaction into the current proof structure. Since transactions are committed sequentially, i is the ordinal position of this transaction's commitment since the initial database state. This transaction is identified by the host as $T_i$—i.e., the $i^{th}$ transaction to commit. Concurrency control will ensure that this transaction's reads were consistent with $DB_{i-1}$—the consistent state corresponding to all earlier committed transactions. If this is not the case, then the transaction will not be allowed to commit (assuming only strict, serializable executions). Once it commits, its changes will be included in the next conceptual consistent state, $DB_i$. These changes are handled by the normal database processing. The host records the authorization message from the accessor along with the transaction's commit position, i.

The host needs to declare that $T_i$ was applied on $DB_{i-1}$ and produced $DB_i$. The host does this by computing the corresponding MBT structures $MBT_{i-1}$ and $MBT_i$. As part of the proof of the commitment of $T_i$, the host sends to the accessor a signed message containing (1) the sequence number submitted by the accessor, (2) the transaction's commit sequence number, i, (3) the label of the root of $MBT_{i-1}$, i.e., $Proof_{i-1}$, (4) the label of the root of $MBT_i$, i.e., $Proof_i$, and (5) RSet, the result set produced by the transaction. The host also sends to the owner a signed message containing (1) $Proof_{i-1}$, (2) $Proof_i$, and (3) the identity of the client that sent this transaction and the SID. Note that for a read-only transaction, the host does not need to send anything to the owner.

The owner uses the message from the host (after verifying the signature) to maintain the sequence of proofs: $Proof_0$, $Proof_1$, ... $Proof_i$ that the host claims to be the sequence of consistent states that the database has gone through. The owner checks to see that $Proof_{i-1}$ is currently the last value in its proof chain. If this is the case, the owner adds $Proof_i$ to the end of the chain. The owner also retains the client ID and SID sent by the host. The owner checks (every time, or randomly) to see that the SID has not been used by this client earlier and is in increasing order for the client. The accessor verifies the host's signature, and sends $Proof_{i-1}$ and $Proof_i$ to the owner. The owner checks that $Proof_{i-1}$ does indeed precede $Proof_i$ in the sequence received from the host. If this is not the case, the owner has detected a problem.

In accordance with one embodiment of the invention, the transaction execution process can be summarized as follows:

(1) the accessor sends $S_{Accessor}$(TName; Params; SID) to the host with TName specifying one of the replayable transactions, Params specifying the parameters for the transaction, and SID specifying the unique transaction sequence number generated by the accessor, (2) the host records this message after verifying the signature and executes the transaction, (3) if the transaction successfully commits, the host computes $MBT_i$ and sends $S_{Host}$(SID; i; $Proof_{i-1}$; $Proof_i$;RSet) to the accessor, where i is the transaction's commit sequence number, and RSet are the values read by the transaction, (4) the host also sends to the owner $S_{Host}$(i, $Proof_{i-1}$; $Proof_i$; $S_{Accessor}$(TName, Params, SID)), (5) the owner verifies the signature and then adds $Proof_i$ to its chain of proofs after verifying that $Proof_{i-1}$ is at the end of the current chain, (6) the accessor sends $S_{Accessor}$($Proof_{i-1}$; $Proof_i$) to the owner, and (7) the owner checks that $Proof_{i-1}$ and $Proof_i$ are contiguous proofs in its chain and checks that the SID is larger than the largest SID the owner already had for this client.

In accordance with one embodiment of the invention, the transaction verification process is performed following the execution of a transaction. Following the execution of a transaction, the owner or the accessor can arbitrarily decide if the host should verify a given transaction (current or past). If the owner or accessor asks for verification of Transaction $T_i$, the host needs to establish three requirements.

First, the host has to show that all values read by the transaction were indeed from $DB_{i-1}$. As is always the case, if $T_i$ updates a data value and subsequently reads it, it should be reading the value it wrote, not the one from $DB_{i-1}$. This may be accomplished during the verification of the execution. To do this, the host needs to produce the verification objects for the reads from $MBT_{i-1}$. For now, the host may maintain a copy of each MBT or alternative optimized structures. The accessor uses the correctness and completeness mechanisms discussed earlier to verify the reads.

Second, the accessor needs to know the correct values of all updates generated by the given (replayable) transaction when run on a database corresponding to $DB_{i-1}$. The validity of the values read by the transaction is achieved as discussed above. Given a replayable transaction and the values read by the transaction (as declared by the host and validated in the previous step), the values of its updates need to be determined. This verification is the onus of the owner or the accessor. Given a deterministic transaction, and the values that it reads, it is possible to determine the values of its output and updates. Those of skill in the art will appreciate that the verification may be performed in a number of ways including setting up a rudimentary database and running the query, manual inspection of the inputs, query, and outputs, or using a special-purpose tool.

Third, the owner or the accessor needs to establish that the updates of the transaction were faithfully recorded in the database and used for subsequent transactions. To do this, the host needs to show that $MBT_i$ differs from $MBT_{i-1}$ by exactly the modifications of $T_i$. The host can generate $MBT_i$ in a manner similar to the generation of $MBT_{i-1}$.

In accordance with one embodiment of the invention, the transaction execution process can be summarized as follows:

(1) the accessor asks the host to verify a transaction $T_i$,
(2) the host computes $MBT_{i-1}$ and $MBT_i$,
(3) the accessor obtains $Proof_{i-1}$ and $Proof_i$ from the owner,
(4) the host sends to the accessor the verification objects for all values read by $T_i$ based on $MBT_{i-1}$,
(5) the accessor verifies the correctness and completeness for $T_i$'s reads,
(6) the accessor determines the outputs and updates for $T_i$ (replays $T_i$) given these reads,
(7) the host sends to the accessor the verification objects for $T_i$'s updates based on $MBT_i$, and
(8) the accessor verifies that $MBT_i$ contains these updates.

In accordance with an embodiment of the present invention, failure on the part of the host may be detected. Detection happens when the owner or the accessor decide to verify a given transaction. While it is unlikely that most transactions will be verified, the model for untrusted hosts ensures that even if a single instance of infidelity is detected by the owner it will result in severe penalties for the host. These could include immediate loss of the owner's business, or a lawsuit. In order to increase the likelihood of being caught, it is desirable that any arbitrary transaction can be verified—even one executed a while back.

If the host drops a transaction, for example, a transaction is submitted by the accessor that the host pretends to execute (i.e., sends unauthentic responses to the accessor, but does not actually execute the transaction), the host will be unable to verify the correctness of that transaction if asked. The verification for this transaction will fail since the host will not be able to show that the state corresponding to $Proof_i$ for this transaction reflects the correct execution of $T_i$.

If the host executes an unauthorized transaction, it will result in either (1) a discrepancy between the latest $Proof_i$ that the host has and that at the end of the owner's proof chain such that the host will be unable to verify future transactions, or (2) a message from the host to the owner with an unauthorized pair of proofs. If the owner asks the host to prove this link in the chain, the host will have to produce the original request from an authorized client for this transaction. The host will be unable to produce such a signed message. Replay attempts by the host such as when the host tries to execute an authorized transaction more than once will be caught when the owner receives the Client; SID values that do not show an increase in SID. The owner needs to periodically run verification checks to ensure that the host does not run unauthorized transactions. The owner does this by randomly identifying transactions and asking for them to be validated.

If the host does not run the transactions in the claimed sequence, the chain of proofs maintained by the owner prevents this from happening. The host informs the accessor of the commit sequence, i, for each transaction. The corresponding pair of proofs, $Proof_{i-1}$ and $Proof_i$ must validate this transaction. If the host does not specify these correctly, verification fails.

If the host is honest and faithfully executes all transactions submitted by the owner or the accessor, then the host can prove his innocence via an indemnification process. In accordance with one embodiment of the invention, the indemnification process is performed as described below.

First described is the host's indemnity from the accessor. In order to verify a transaction submitted by the accessor, the host needs the following from the accessor: (1) the request for running the transaction including the transaction name, its parameters, and a sequence number, and (2) the accessor's ability to replay a transaction faithfully. The accessor cannot repudiate the request for running a transaction since the accessor signs the request with all the necessary information. If the accessor does not replay a transaction correctly, the host can check that by replaying it in order to implicate the accessor. This is possible because each transaction is known to each party. To strengthen this, the host may want the owner to sign each transaction's definition if it is not pure SQL. The parameters cannot be repudiated by the accessor, the values read from the database are known to the host such that they can be verified that they are consistent with the consistent state corresponding to the proof value the host sent to the accessor in response to the transaction request. Thus, it is not possible for the accessor to falsely implicate the host.

Second described is the host's indemnity from the owner. The host relies on the owner to maintain the chain of proofs and also to check that a given SID has not been used earlier for a given client. The owner cannot modify the chain with impunity. If the owner adds a proof that the host has not provided, the owner would have to produce a signed message from the host containing the old and new proofs. the owner cannot manufacture such a signed message. The owner cannot also delete any proof from the chain. If the owner deletes $Proof_i$ from the chain, the host can ask the owner to produce the host's message with $Proof_{i-1}$; $Proof_{i+1}$ (as they are now contiguous in the chain). Since the host never sent such a message, the owner would be unable to produce such a message signed by the host. If the owner claims that an SID value for a client is being reused by the host, the owner can once again be challenged to produce the prior message from the host containing this SID and client pair. If the host has never sent the owner such a message, the owner will be unable to produce it.

Thus, the host is protected from baseless claims of wrongdoing from either the owner or the accessor.

In accordance with an embodiment of the invention, the efficiency of the authentication process may be improved by several optimizations, as described below.

In the above protocol, the host has to maintain the details of which values are read and written by all transactions, and the information necessary to generate the MBT structures for any transaction in the past. The size of this information can grow to be very large. To avoid this, verification checkpoints may be introduced. A verification checkpoint corresponds to a statute of limitations for the owner. In other words, the owner is barred from verifying any transaction beyond a certain time in the past, for example, a month. Thus the owner has up to one month to challenge any transaction. After this point, if the transaction is not challenged, the host can assume that the owner accepts it and the host can discard any data necessary to verify that transaction.

The owner's burden is significantly reduced in the protocol since the owner can choose to do less frequent testing while still retaining the ability to verify any transaction. The owner is, however, involved in each transaction such that the owner has to maintain the chain of proofs and track the SIDs for each client. This burden can be reduced by involving a semi-honest third party that the owner trusts to handle these tasks. For purposes of this application, the third party is referred to herein as a tester. If the owner can be assured that the tester and the host do not collude, then the owner can be reasonably confident that the tester can maintain checks on the host. The owner could always ask for the verification of any transaction by the tester.

The host may maintain a copy of each successive $MBT_i$ corresponding to the commit of each transaction. This may be expensive and unnecessary. To reduce the cost of storage, each tuple in the database and each node in MB-Tree is assigned a unique id. Each tuple in the relation is also assigned a version number. A history stores each value that a tuple or a node takes as the database evolves. At the start, for each tuple and MB-Tree node, the history stores only one value—the value in the database or MB-Tree after the initialization step. Each initial tuple value is assigned version number 0. When a tuple or a node is modified, the version number is incremented by one and the new value is added to the history along with the transaction's sequence number which modified the value. As the database evolves, the history stores all the values that a particular tuple or MB-Tree node takes on consistent states. When an accessor wants to verify an old transaction, the host can use the history to generate the values that the server read when executing this transaction.

In accordance with one embodiment of the invention, a secure provenance of the data is provided using history. With history, the host can show which transactions modified a particular tuple. Since with each transaction, the data owner stores the Proof (root label when the transaction was executed), the data owner can verify the correctness of each past value of the tuple, proving the trustworthiness of provenance for that tuple. Since each transaction is signed by the accessor, and the data owner has the proof chain, the host cannot add false history values or drop a value. The data owner can also ask the complete provenance of the database and verify its trustworthiness.

When an accessor asks for the provenance of a tuple, the server responds with a set of provenance records. Each provenance record has three components: the id of the transaction that created that value; the version of the tuple; and the value of the tuple. The accessor can verify that the returned provenance has not been maliciously manufactured by the host.

An embodiment of the authentication data structures and protocols according to the present invention is implemented as described in detail below.

The authentication data structures and protocols are implemented in Oracle—commercial strength database management system that is popularly used by industries and researchers. The implementation is built on top of Oracle without making any modifications to the source code or internals. This demonstrates the applicability of the invention to an existing DBMS. The protocols are implemented in the form of database procedures using PI/SQL. Additional efficiency may be gained by modifying the database internals or exploiting the index frameworks. The data structures may also be created and managed for any generic DBMS.

TABLE 2

Tables in the Database

| Table | Description |
|---|---|
| uTable | TupleID, A, Version# |
| uTableHistory | TransactionID, TupleID, A, Version# |
| uTableMBT | id, level, Label, keys, children, key_min, key_max |
| uTableMBTHistory | TransactionID, id, parentID, level, Tuple ID, Label, childLabels, canAccomodate, index |
| Transaction | id, query, finalLabel |

A synthetic database is created with one table uTable of 1 million tuples. uTable is composed of a table with 2 attributes (TupleID and A). Table 2 describes different tables used in the prototype. An MB-Tree is created on attribute A (integer). The table is populated with synthetic data with random values of A between $-10^7$ and $10^7$. Three transactions are implemented as stored procedures, namely Insert, Delete, and Select. "Insert" creates a new tuple with a given value of attribute A. "Delete" deletes the tuples which have the given value of attribute A and "Select" is a range query over attribute A. In practice, transactions will be more complex than a single insert or delete. The solution can handle complex transactions as well. However, for simplicity, only simple transactions are considered. The experiments were run on an Intel Xeon 2.4 GHz machine, 12 GB RAM and 7200 RPM disk with a transfer rate of 3 Gb/s, running Oracle 11 g on Linux. Oracle is run with a strict serializable isolation level. A standard block size of 8 KB is used.

Figure 6:
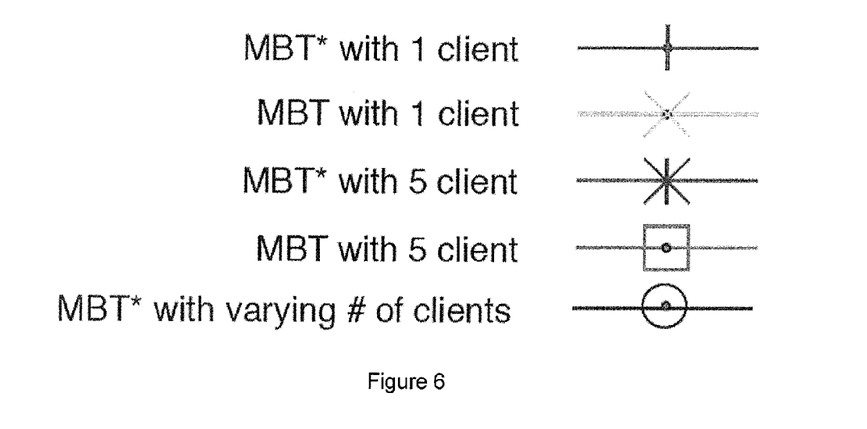
FIG. 6 illustrates the legends used in the experimental result graphs according to the invention.
Figure 7:
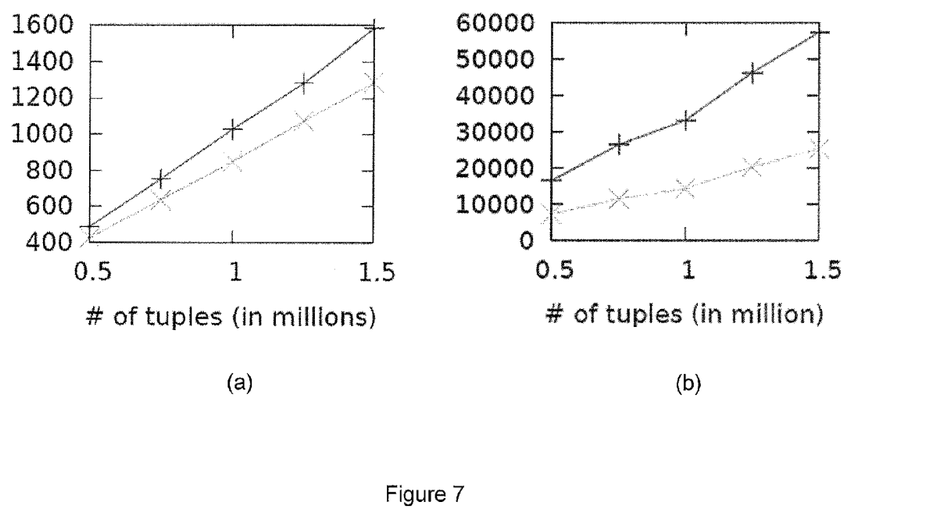
FIG. 7 are graphs illustrating the effect of database size on (a) construction time and (b) storage cost according to the invention.

Now, the overhead of constructing (bulk loading) the present invention is examined. FIG. 6 illustrates the legends used in the experimental result graphs as shown in FIG. 7 through FIG. 12. For the present invention, there is an extra cost for storing the history of the database, which increases the storage cost and construction time. FIGS. 7(a) and 7(b) show the effect of data size on construction time and storage overhead or cost, respectively. Both costs increase linearly with the size of the database. In addition to the MB-Tree, an extra copy of the MB-Tree and the database table is maintained in the history files. Hence, the solution incurs a 100% storage overhead. The construction time has two components; time to compute hashes and time for IO. The proposed protocol needs twice the amount of IO as compared to MB-Tree, however, the IO cost is superseded by hash computation. Hence, the construction time is not much higher than maintaining just an MB-Tree. In past work, the verification of a transaction was only allowed immediately after the execution of a transaction before any other transactions are executed. This restriction is removed to enable the verification of past transactions. This provides much greater flexibility and reduces the need to immediately verify transactions. Of course, the added functionality comes at an additional storage cost for the history tables.

Figure 8:
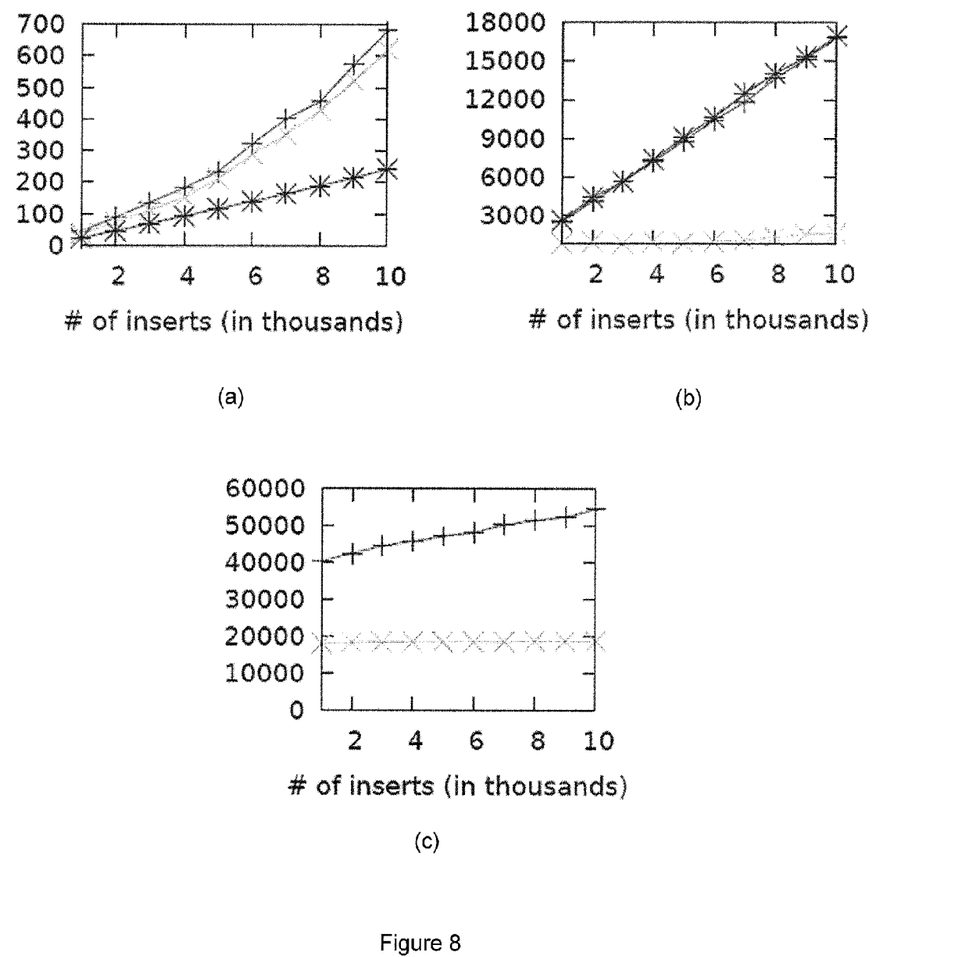
FIG. 8 are graphs illustrating (a) execution time, (b) IO cost and (c) space cost as the number of insert transactions increases according to the invention.

Next, the cost of inserting and deleting tuples is examined. Since both operations show similar costs, only the results for insertion are presented. For this experiment no verification is performed. The first experiment studies the performance as the number of insert transactions increases. FIGS. 8(a), 8(b) and 8(c) show the results. As expected, with a single accessor, the proposed protocol incurs a much higher overhead for storage and IO for maintaining the history information. These costs increase linearly with the number of transactions. However, this does not translate into a significant increase in the running time. This represents the computational overhead of hashing and concatenations which dominate the cost. A key advantage of the present invention comes to light as the number of concurrent clients increases, as seen in FIG. 8(a) where the running time for our the protocol drops significantly.

Figure 9:
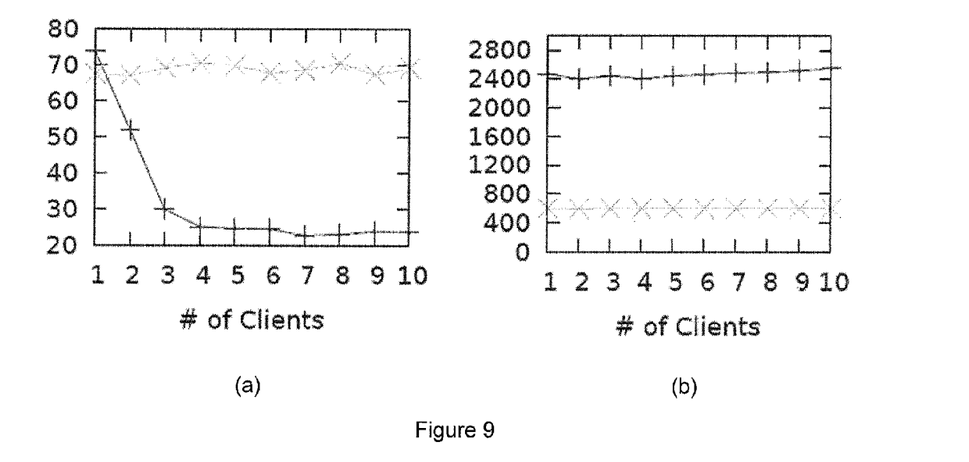
FIG. 9 are graphs illustrating (a) execution time and (b) IO cost for insert transactions with a varying number of clients according to the invention.

In order to better study the impact of concurrent clients, another set of experiments was ran with 1000 insert transactions with a varying number of clients. The results are shown in FIGS. 9(a) and 9(b). The MB-Tree solution which needs to process all updates through a single node (the data owner) sees no gain in performance, whereas the proposed solution results in improved performance with greater concurrency (even though it is performing a much larger amount of IO).

Figure 10:
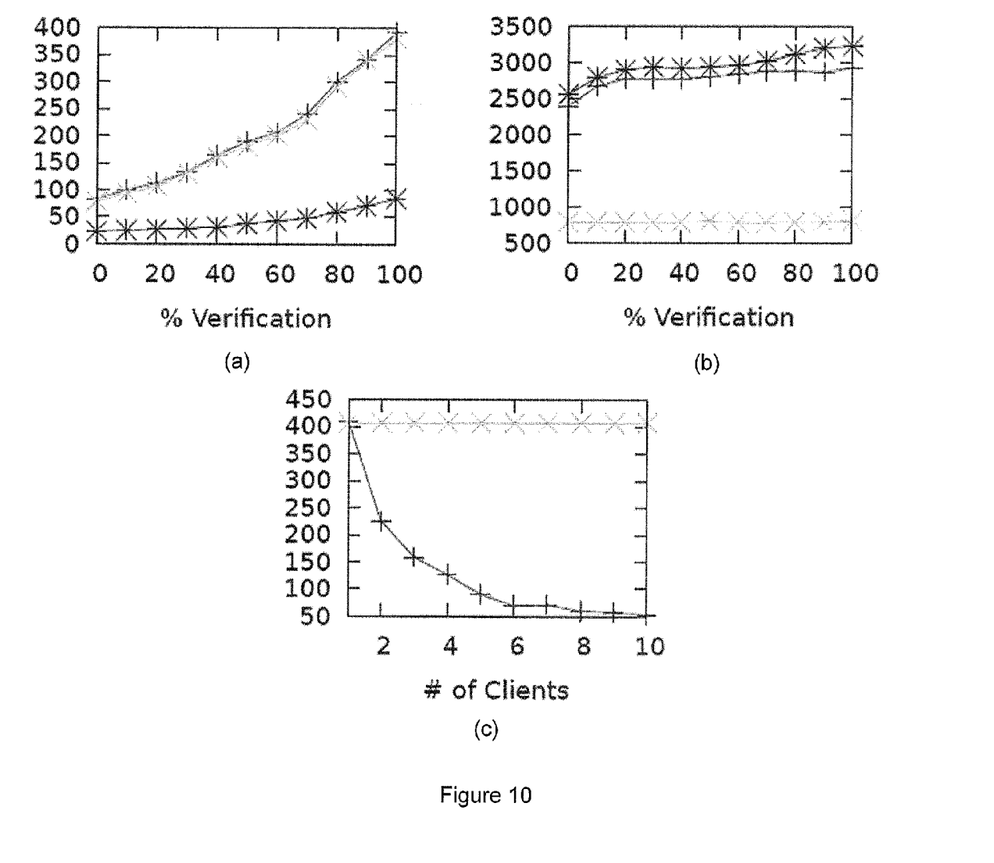
FIG. 10 are graphs illustrating the effect of insert transactions with increasing fractions of transactions on (a) execution time, (b) IO cost and (c) the effect of the increase in number of clients on execution time according to the invention.

Next, the overhead of transaction verification on the system is examined. One-thousand insert transactions with increasing fractions of transactions that are verified were executed. The percentage of transactions that are verified reflects the data owner's distrust of the host. FIGS. 10(a) and 10(b) show the results. As the verification percentage increases, it is observed that the execution time of the transactions increases. However, disk IO does not increase as rapidly since there is little extra IO for verification as compared to running the transaction itself. Verification also takes advantage of already cached MB-Tree nodes.

FIG. 10(c) shows the effect of the increase in number of clients on execution time. For this experiment, 1000 insert transactions and each transaction is verified. As before, the proposed prototype scales much better to the increase in the number of clients. This is because verification can be done independent of transaction execution, hence, verification executes while other transactions are running. Whereas for the case of just an MB-Tree, the verification of a transaction prevents other transactions from running.

Figure 11:
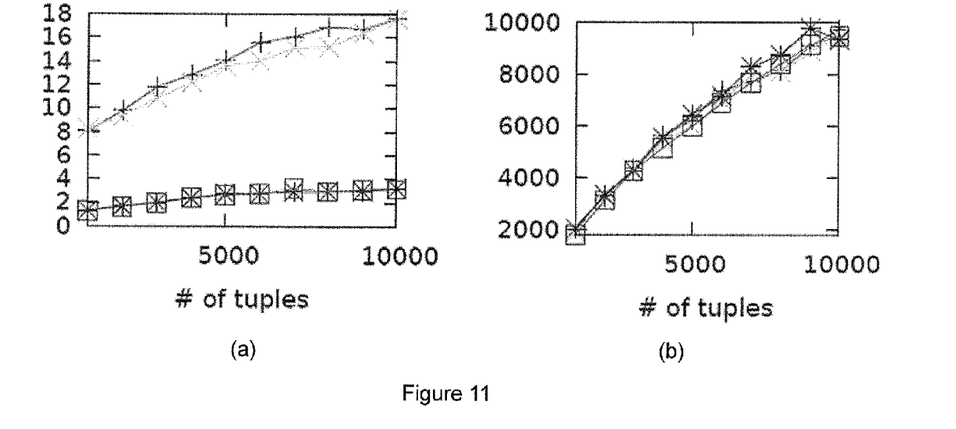
FIG. 11 are graphs illustrating (a) execution time and (b) IO cost of range queries with verification according to the invention.

Next, the performance of the proposed solution for range queries (Search) is examined. This cost is influenced by both the size of the result (larger results will be more expensive to verify) and the size of the history that needs to be searched for generating the proof. Two experiments were conducted to study this behavior. In the first experiment, 1000 insert transactions were ran on the database to populate history. Then, 100 search transactions with 100% verification for different ranges (thereby with different result set size) were executed. FIGS. 11(a) and 11(b) show the results. As the result set size increases, execution time and the amount of IO increase. For verification, the server has to return the right and left most path of the range. Along with this, the server also has to return which tuples belong to which leaf nodes, as that is crucial information for the client to be able to verify the result set. Hence, as the result set size increases, the verification object size increases which results in increase in verification time. The performance of the solution is comparable to that of an MB-Tree alone.

Figure 12:
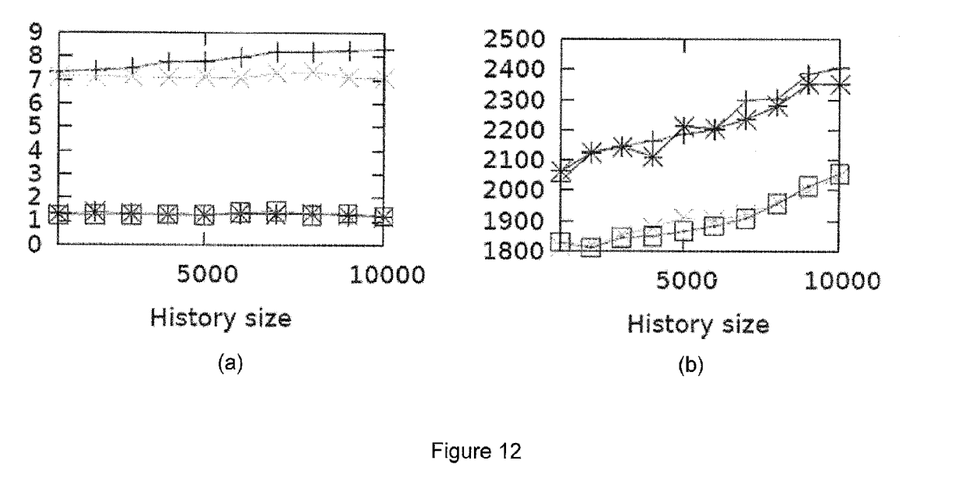
FIG. 12 are graphs illustrating (a) execution time and (b) IO cost of range queries with verification when history size is varied according to the invention.

In the second experiment, the history size is varied by executing varying numbers of insert transactions before running a fixed search and verification. FIGS. 12(a) and 12(b) show the effect of increase in history size. The x-axis in both graphs represents number of insert transactions executed before running the search transactions. As expected, increase in the history size increases the verification time for the solution. However, it does not increase rapidly. Note that the search time without verification for the solution and MB-Tree was the same, hence it is not reported separately.

It is contemplated that the proposed ideas can be easily implemented on top of an existing DBMS. Even with this simple implementation, the overhead for ensuring transactional consistency is reasonable over and above the cost of ensuring only correctness and completeness. Additional optimization methods will be apparent to those skilled in the art from consideration of the specification and practice of the embodiments disclosed herein.

Figure 13:
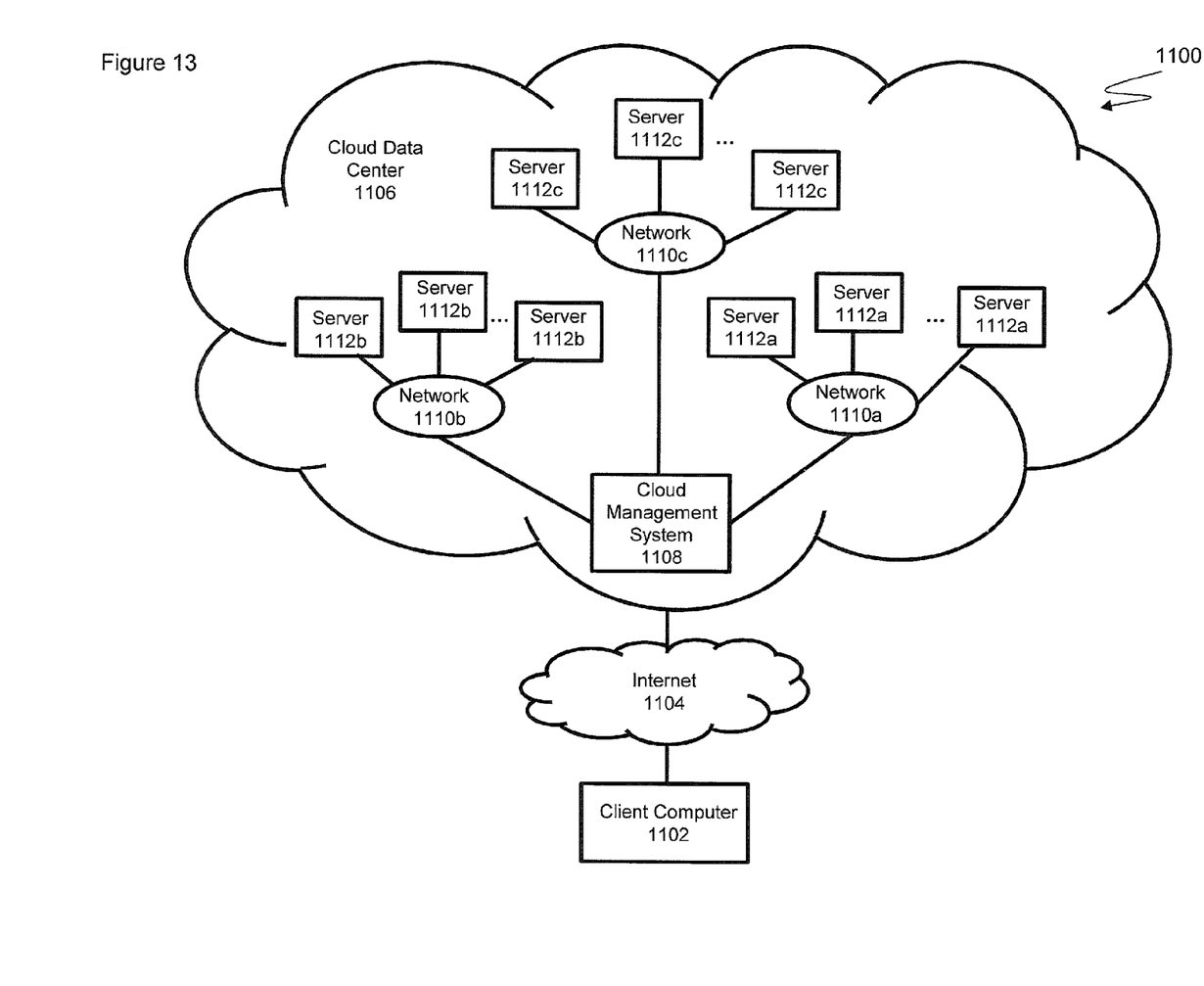
FIG. 13 illustrates an exemplary cloud computing system that may be used to implement the methods according to the present invention.

FIG. 13 illustrates an exemplary cloud computing system 1100 that may be used to implement the methods according to the present invention. The cloud computing system 1100 includes a plurality of interconnected computing environments. The cloud computing system 1100 utilizes the resources from various networks as a collective virtual computer, where the services and applications can run independently from a particular computer or server configuration making hardware less important.

Specifically, the cloud computing system 1100 includes at least one client computer 1102. The client computer 1102 may be any device through the use of which a distributed computing environment may be accessed to perform the methods disclosed herein, for example, a traditional computer, portable computer, mobile phone, personal digital assistant, tablet to name a few. The client computer 1102 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 1102 also includes a communications interface, for example, a modem, a network interface (such as an Ethernet card), a communications port, a PCMCIA slot and card, wired or wireless systems, etc. The communications interface allows communication through transferred signals between the client computer 1102 and external devices including networks such as the Internet 1104 and cloud data center 1106. Communication may be implemented using wireless or wired capability such as cable, fiber optics, a phone line, a cellular phone link, radio waves or other communication channels.

The client computer 1102 establishes communication with the Internet 1104—specifically to one or more servers—to, in turn, establish communication with one or more cloud data centers 1106. A cloud data center 1106 includes one or more networks 1110a, 1110b, 1110c managed through a cloud management system 1108. Each network 1110a, 1110b, 1110c includes resource servers 1112a, 1112b, 1112c, respectively. Servers 1112a, 1112b, 1112c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 1108 can comprise a dedicated or centralized server and/or other software, hardware, and network tools to communicate with one or more networks 1110a, 1110b, 1110c, such as the Internet or other public or private network, with all sets of resource servers 1112a, 1112b, 1112c. The cloud management system 1108 may be configured to query and identify the computing resources and components managed by the set of resource servers 1112a, 1112b, 1112c needed and available for use in the cloud data center 1106. Specifically, the cloud management system 1108 may be configured to identify the hardware resources and components such as type and amount of processing power, type and amount of memory, type and amount of storage, type and amount of network bandwidth and the like, of the set of resource servers 1112a, 1112b, 1112c needed and available for use in the cloud data center 1106. Likewise, the cloud management system 1108 can be configured to identify the software resources and components, such as type of Operating System ("OS"), application programs, and the like, of the set of resource servers 1112a, 1112b, 1112c needed and available for use in the cloud data center 1106.

The present invention is also directed to computer products, otherwise referred to as computer program products, to provide software to the cloud computing system 1100. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 1100 of FIG. 11 is provided only for purposes of illustration and does not limit the invention to this specific embodiment. It is appreciated that a person skilled in the relevant art knows how to program and implement the invention using any computer system or network architecture.

While the invention has been described with reference to particular embodiments, those skilled in the art will recognize that many changes may be made thereto without departing from the scope of the invention. Each of these embodiments and variants thereof is contemplated as falling with the scope of the claimed invention, as set forth in the following claims.

The invention claimed is:

1. A method for ascertaining consistency of a transaction in a untrusted database, comprising:
   providing a server computer in communication with a computer network including a client computer, wherein the server computer hosts the untrusted database as provided by an owner of the untrusted database through an owner computer;
   generating by the server computer before-transaction authentication data corresponding to an initial state of the untrusted database;
   sending from the client computer a transaction including a transaction sequence number;
   receiving by the server computer the transaction including the transaction sequence number;
   confirming by the server the transaction sequence number is greater than any previously received transaction sequence number;
   executing by the server computer the transaction on the untrusted database to obtain an executed transaction;
   generating by the server computer an update based on the executed transaction;
   applying by the server computer the update to the untrusted database;
   creating by the server computer after-transaction authentication data corresponding to a subsequent state of the untrusted database, wherein the subsequent state is resultant from the update based on the executed transaction;
   transmitting a report message from the server computer to the client computer, wherein the report message comprises the before-transaction authentication data and the after-transaction authentication data; and
   verifying by the client computer faithful execution of the untrusted database by the server computer using the report message.

2. The method according to claim 1, further comprising the steps of:
   determining a commit sequence of the executed transaction; and
   transmitting the commit sequence to the owner of the untrusted database through the owner computer.

3. The method according to claim 1, further comprising the steps of:
   computing by the owner computer an owner-generated initial proof corresponding to the initial state of the untrusted database;
   verifying by the server computer the owner-generated initial proof with a host-generated initial proof; and
   retaining by the server computer the owner-generated initial proof.

4. The method according to claim 1, wherein the transaction includes a digital signature corresponding to the client computer.

5. The method according to claim 1, wherein the before-transaction authentication data includes a proof of the initial state of the untrusted database.

6. The method according to claim 5, wherein the before-transaction authentication data comprises a hash tree structure corresponding to the initial state of the untrusted database.

7. The method according to claim 6, wherein the proof corresponds to a root of the hash tree structure.

8. The method according to claim 1 further comprising the steps of:
   receiving by the owner computer the report message;
   verifying by the owner computer that the before-transaction authentication data is a first proof in a proof chain, wherein the proof chain includes the initial state of the untrusted database and the subsequent state of the untrusted database;
   adding a last proof to the proof chain, wherein the last proof is the after-transaction authentication data;
   confirming the first proof and the last proof are contiguous proofs in the proof chain; and
   validating that the transaction sequence number is greater than a largest transaction sequence number known to the owner computer.

9. The method according to claim 1 further comprising the step of supplying a provenance record to verify trustworthiness of changes to the untrusted database.

10. A method for ensuring faithful execution of content by a computing service provider, comprising:
    providing by an owner computer an untrusted database to a host computer;
    confirming by the owner computer and the host computer an initial consistent state for the untrusted database;
    requesting by a client computer one or more transactions on the untrusted database;
    executing by the host computer the one or more transactions on the untrusted database to obtain one or more executed transactions;
    updating by the host computer the untrusted database with the one or more executed transactions;
    generating by the host computer a first verification object and a second verification object, wherein the first verification object comprises a first consistent state of the untrusted database before the one or more executed transactions and the second verification object comprises a second consistent state of the untrusted database after the one or more executed transactions;
    returning by the host computer to the client computer a proof of a total consistent state of the untrusted database, wherein the total consistent state of the untrusted database consists of using the first verification object and the second verification object;
    providing by the host computer the proof to the owner computer;
    passing by the client computer the proof to the owner computer; and
    comparing by the owner computer the proof from the host computer and the proof from the client computer, wherein a match between the proof from the host computer and the proof from the client computer ensures faithful execution of the untrusted database by the host computer.

11. The method according to claim 10, wherein the generating step further comprises the step of specifying a commit sequence number.

12. The method according to claim 10, wherein the executing step further comprises the steps of:
- sending by the client computer to the host computer the one or more executed transactions including at least one selected from the group comprising of: one or more parameters for the transaction and a unique transaction sequence number generated by the client computer;
- recording by the host computer the one or more executed transactions; and
- sending by the host computer to the client computer the commit sequence number of the one or more executed transactions when the one or more executed transactions successfully commits.

13. The method according to claim 10 further comprising the step of employing one or more data security tools selected from the group comprising of: one-way hash function, hash tree, and digital signature.

14. The method according to claim 13, wherein the digital signature includes a public-key cryptography and a one-way hash function.

15. The method according to claim 13, wherein the hash tree includes one or more tuples.

* * * * *